(12) United States Patent
Lei et al.

(10) Patent No.: US 8,611,750 B2
(45) Date of Patent: Dec. 17, 2013

(54) WAVELENGTH LOCKER FOR SIMULTANEOUS CONTROL OF MULTIPLE DENSE WAVELENGTH DIVISION MULTIPLEXING TRANSMITTERS

(75) Inventors: Hongbing Lei, Sunnyvale, CA (US);
Xiao A. Shen, San Bruno, CA (US); Yu Sheng Bai, Los Altos Hills, CA (US)

(73) Assignee: Futurewei Technologies, Inc., Plano, TX (US)

( * ) Notice: Subject to any disclaimer, the term of this patent is extended or adjusted under 35 U.S.C. 154(b) by 574 days.

(21) Appl. No.: 12/579,196

(22) Filed: Oct. 14, 2009

(65) Prior Publication Data
US 2011/0085794 A1   Apr. 14, 2011

(51) Int. Cl.
*H04J 14/02* (2006.01)
*H04B 10/04* (2011.01)

(52) U.S. Cl.
USPC ............ 398/95; 398/93; 398/17; 398/25; 398/32; 398/34; 398/182; 398/195; 398/196

(58) Field of Classification Search
USPC ............ 398/17, 25, 93–98, 182, 195, 196; 359/124
See application file for complete search history.

(56) References Cited

U.S. PATENT DOCUMENTS

| | | |
|---|---|---|
| 5,030,310 A | 7/1991 | Wogoman |
| 6,396,603 B1 | 5/2002 | Kim |
| 6,735,395 B1 | 5/2004 | Bai |
| 2002/0048063 A1* | 4/2002 | Jung et al. ................... 359/124 |
| 2003/0007526 A1 | 1/2003 | Pontis et al. |
| 2003/0021309 A1* | 1/2003 | Mattox ........................ 372/32 |
| 2003/0112836 A1 | 6/2003 | Kim et al. |
| 2009/0232493 A1* | 9/2009 | Tu ................................ 398/17 |

FOREIGN PATENT DOCUMENTS

| | | |
|---|---|---|
| CN | 1524327 A | 8/2004 |
| CN | 101057424 A | 10/2007 |
| CN | 101247199 A | 8/2008 |
| EP | 1855396 A1 | 11/2007 |
| WO | WO 2008/098475 * 8/2008 | ............ H01S 5/0687 |

OTHER PUBLICATIONS

Lee, Hyunjae et al., "Multichannel Wavelength Locking Using Transmission Peaks of an AWG for Multichannel Optical Transmission Systems," IEEE Photonics Technology Letters, vol. 10, No. 2, Feb. 1998, pp. 276-278.

JDSU, Communications Components, Broadband (Fabry-Perot) Wavelength Locker, www.jdsu.com, Sep. 2008, 5 pages.

(Continued)

*Primary Examiner* — Li Liu
(74) *Attorney, Agent, or Firm* — Conley Rose, P.C.; Grant Rodolph; John H. Scott, III

(57) ABSTRACT

An apparatus comprising a plurality of optical transmitters coupled to a fiber, a signal generator coupled to the optical transmitters and configured to provide a single pilot tone to the optical transmitters, and a processor positioned within a feedback loop between the fiber and the optical transmitters, the processor configured to adjust a wavelength for each of the optical transmitters to lock the wavelengths. An apparatus comprising at least one processor configured to implement a method comprising receiving an optical signal comprising a pilot tone, detecting an amplitude and a phase of the pilot tone, calculating a quadrature term using the amplitude and the phase, and wavelength locking the optical signal using the quadrature term.

22 Claims, 10 Drawing Sheets

(56) References Cited

OTHER PUBLICATIONS

Foreign Communication From A Related Counterpart Application, PCT Application PCT/CN2010/075659, International Search Report dated Nov. 4, 2010, 3 pages.

Foreign Communication From A Related Counterpart Application, PCT Application PCT/CN2010/075659, Written Opinion dated Nov. 4, 2010, 7 pages.

Park, K., J., et al., "A Multi-Wavelength Locker for WDM System," Korea Advanced Institute of Science and Technology, Department of Electrical Engineering, In Proceeding of Optical Fiber Communication Conference, vol. 2, Feb. 2000, pp. 73-75.

Foreign Communication From a Counterpart Application, Chinese Application No. 201080015295.X, Chinese Search Report dated Aug. 20, 2013, 2 pages.

Foreign Communication From A Counterpart Application, Chinese Application No. 201080015295.X, Chinese Office Action dated Aug. 28, 2013, 5 pages.

Foreign Communication From A Counterpart Application, Chinese Application No. 201080015295.X, Partial Translation of Chinese Office Action dated Aug. 28, 2013, 6 pages.

* cited by examiner

WAVELENGTH LOCKER FOR SIMULTANEOUS CONTROL OF MULTIPLE DENSE WAVELENGTH DIVISION MULTIPLEXING TRANSMITTERS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Conventional wavelength division multiplexing (WDM) transmitter arrays may employ semiconductor lasers as optical transmitters. The performance of WDM systems requires signal integrity from the laser sources. The wavelengths of the output signals from the WDM laser arrays may vary due to manufacturing process variations, device age, temperature, or other factors. Individual WDM lasers may have different electrical, optical, and/or thermal properties that also affect the lasers' wavelengths. Wavelength locking can facilitate signal integrity, but is difficult to do when the lasers' wavelengths vary.

One approach to provide wavelength locking has been to employ a feedback system to compare actual laser output wavelength to the target laser output wavelength. Laser output can then be adjusted to correct for deviations. In some applications, a wavelength locker is used for each laser in an array. As the number of individual optical transmitters increases, the complexity and cost for wavelength locking may also increase. What is needed is a way to provide efficient and cost-effective wavelength locking.

SUMMARY

In an embodiment, the disclosure includes an apparatus comprising a plurality of optical transmitters coupled to a fiber, a signal generator coupled to the optical transmitters and configured to provide a single pilot tone to the optical transmitters, and a processor positioned within a feedback loop between the fiber and the optical transmitters, the processor configured to adjust a wavelength for each of the optical transmitters to lock the wavelengths.

In an embodiment, the disclosure includes an apparatus comprising at least one processor configured to implement a method comprising receiving an optical signal comprising a pilot tone, detecting an amplitude and a phase of the pilot tone, calculating a quadrature term using the amplitude and the phase, and wavelength locking the optical signal using the quadrature term.

In an embodiment, the disclosure includes a method comprising receiving an optical signal generated by an optical transmitter, the optical signal having a spectral shape, determining a peak of the optical signal, locking onto the peak, and determining whether an output from the optical transmitter needs to be adjusted based on the locking.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Conventional wavelength locking schemes used in WDM applications may use a wavelength locker for each wavelength. For example, for wavelength spacing of about 100 Gigahertz (GHz) or less, a wavelength locker may be used for each laser. For wavelength locking, a reference signal is measured, as well as a signal transmitted through an etalon. These two signal intensities are then compared to determine the deviation from a target wavelength. Typically, the wavelength lockers are designed to lock at the short-frequency side of the etalon transmission peaks. The locking point may be determined as a distance equal to about 20 percent of the free spectral range from its peak. This point is defined by the intersection of the two spectra at the upward slope of the etalon spectra.

Figure 1:
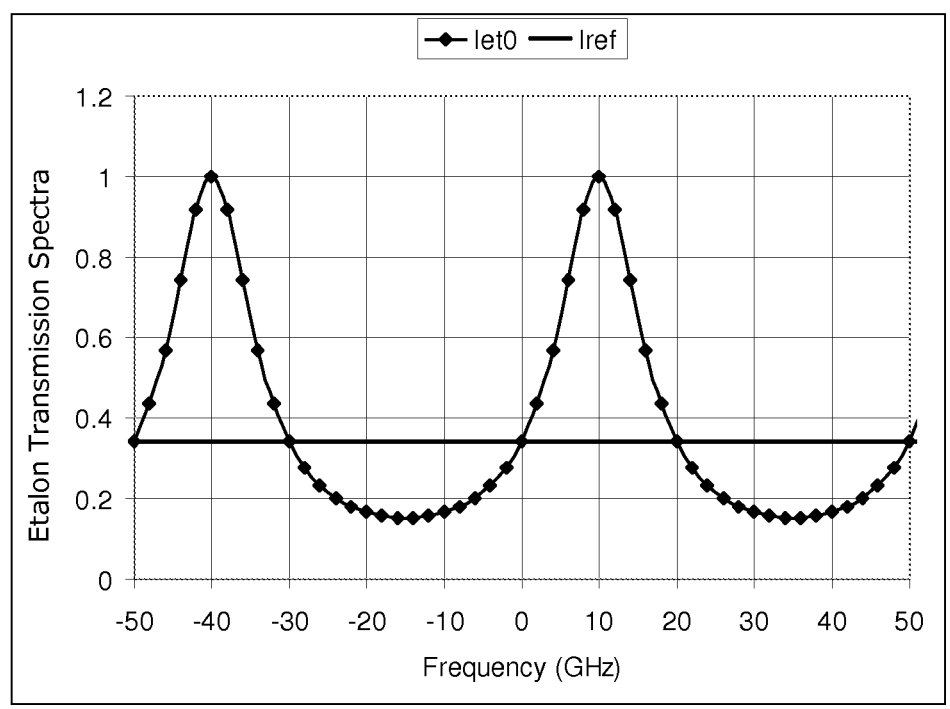
FIG. 1 is a graph of an embodiment of a plurality of transmission spectra from an etalon.

FIG. 1 shows spectra obtained from a 50 GHz free spectral range etalon wavelength locker and a reference signal. The straight line is the reference signal, while the periodical line is from the signal transmitted through the etalon. These spectra are obtained by scanning a laser with a sufficiently narrow line width (narrower than the line width of the etalon) and plotting the received signals as a function of the laser wavelength. If the reference signal is equal to the transmitted signal in strength, the wavelength is considered to be locked. Otherwise, it is considered to be off from its target. The sign of the difference in signal intensity seen by the two detectors tells the direction of the deviation so that appropriate actions can be taken to correct the wavelength back to its target. In the case illustrated in FIG. 1, the locking point may be determined to be the point where the periodic line crosses the straight line with an upward slope. That is, the locking point may be at about −50 GHz, about zero GHz, or about 50 GHz, each being essentially the same, based on the repetitive nature of the signal.

In another scheme, multiple WDM transmitters may share one wavelength locker. In this scheme, a mechanism is needed to choose one wavelength at a time for detection. There are a number of methods used to accomplish the task. In Time Division Multiplexing (TDM), a tunable optical filter may be used with the wavelength locker. In a pre-determined time window, the locker may be tuned to one selected wavelength using the filter. The selected wavelength can then be corrected in a manner identical to that of the dedicated wavelength locker described above. By scanning the filter across multiple wavelengths, the wavelength of each transmitter may be determined, relative to the target, one wavelength channel at a time. The wavelength of each transmitter can then be corrected if there is any deviation from the target. Since the wavelength of a transmitter may drift slowly (e.g. on the order of hours or days), this filter-based TDM approach may be sufficiently reliable and is commonly used in the transport industry for centralized wavelength locking.

An alternative TDM approach is to introduce a dither signal to the wavelength selected to be stabilized. The dither signal has a pre-selected frequency, and is added to the normal data being transported by the WDM transmitter. The frequency is typically between about several tens of kilohertz (kHz) to about several hundreds of kHz. The same etalon unit can be used to lock the selected wavelength that has the dither applied by only considering the signal component corresponding to the dither frequency. If the same edge-locking mechanism described above is used, one can determine the wavelength deviation by comparing the two components of the reference and etalon signal at the dither frequency. If the etalon signal is greater than that of the reference signal, the output wavelength may be shorter than the desired wavelength and the laser transmitter must be adjusted to a longer wavelength. Otherwise, the output wavelength may be longer than the desired wavelength and must be adjusted in the opposite direction. If the two signals are equal, the transmitter may be operating at the desired wavelength. A control loop, such as a digital or analog control loop, can be built based on the ratio of the two signals (also referred to as the α parameter) to stabilize the wavelength.

Frequency division multiplexing (FDM) can also be used with dither signals. In the FDM case, a dither with a different frequency is introduced to each WDM transmitter. For example, each transmitter n (n=1, 2 ... N) may use a dither frequency $f_n$, where N is an integer. The optical signals from the N transmitters are wavelength-division multiplexed onto a single fiber and then detected. The detected signals are then broadcasted to N channels, each of which measures the component corresponding to its corresponding dither frequency using the proper choice of electronic filters. Thus, one may simultaneously obtain N cc parameters, which may each indicate the deviation of the wavelength from its target. In the case of TDM, the same dither frequency is used for all N transmitters but is applied one transmitter at a time, as in the case of the DC approach. For instance, in time slot $t_n$, the dither is applied to transmitter n and the wavelength locker only detects wavelength $\alpha_n$. In time slot, $t_n+1$, the process is repeated for transmitter n+1 and so forth.

Both the TDM and FDM based methods are found to be cost-effective for centralized wavelength stabilization in WDM applications. However, the use of filters for wavelength locking via TDM has disadvantages. For instance, the TDM based method may not be cost effective to implement. A typical tunable optical filter for 50 GHz spacing may cost more than a wavelength locker. In addition, this approach to wavelength locking has limitations. Further, the TDM based method may only be used with the edge-locking method which may require that the optical spectra of all of the transmitters be nearly identical, as described in more detail below. If the spectra vary from transmitter to transmitter, such as in the case of directly modulated lasers and/or different modulation formats/rates, the edge-locking approach may introduce large variations in the locking points.

Figure 2:
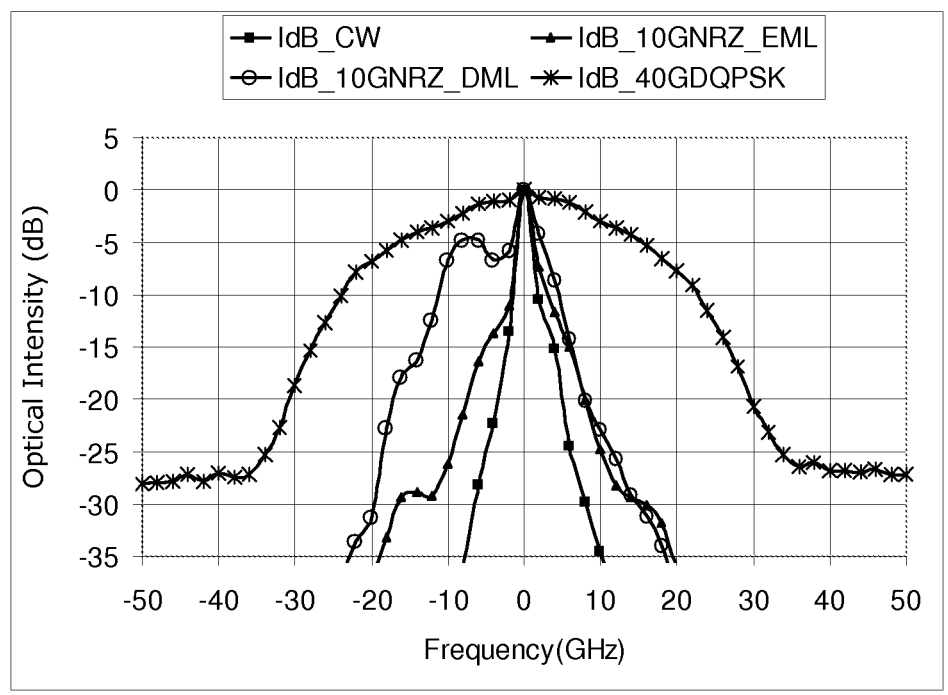
FIG. 2 is a graph of an embodiment of a plurality of optical intensity spectra of different modulated signals.

FIG. 2 shows four spectra obtained with four different modulations: a continuous wave (CW) source, a 10 GHz non-return-to-zero (NRZ) modulation obtained with a directly modulated laser (DML), a 10 GHz NRZ modulation obtained with an electro-absorption modulated laser (EML), and 40 GHz Differential Phase-Shift Keying (DQPSK). Using the same modulation at 10 GHz, different lasers using the same modulation may have different spectral shapes. For example, the spectrum of a 10 GHz NRZ modulation obtained with the DML has a broader spectrum, due to chirping, than the EML. If the same edge-locking method is used as shown in FIG. 2, the locking point will vary substantially, depending upon the modulated line-width.

Figure 3:
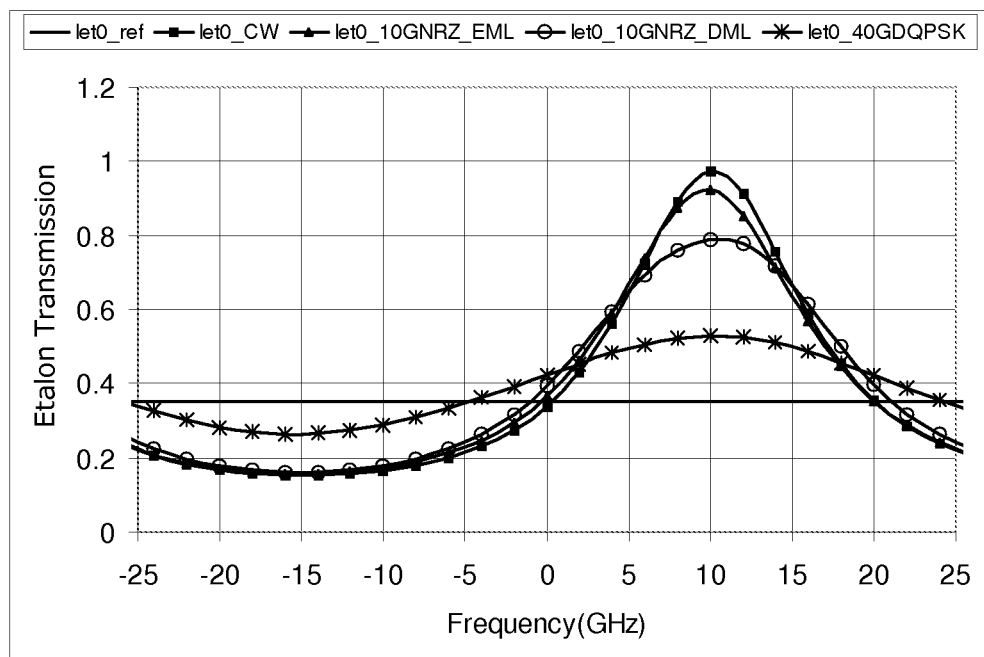
FIG. 3 is a graph of an embodiment of a plurality of etalon transmission spectra of different modulated signals.

FIG. 3 depicts the different intersection points with the reference signal (shown as a straight line) for the different modulations shown in FIG. 2. In FIG. 3, the etalon spectrum is a convolution of the etalon spectrum with the modulated line-width. Consequently, at the same locking point, as defined by an intensity equal to that of the reference signal, the corresponding wavelength varies significantly. For the transmitter in FIG. 2 with 40 GHz DQPSK modulation, the detected wavelength is off to the short frequency by as much as about 5 GHz, compared to an offset of about 0.5 GHz in the case of NRZ modulation using EML.

The dither approach using a single wavelength locker via either TDM or FDM has additional problems if the edge-locking method is used. The spectral variation can introduce an uncertainty in the locking point, and the dither itself may interfere with the locking mechanism. The dither commonly applied to the bias current of a semiconductor laser (e.g. a distributed feedback laser) will introduce additional adiabatic and thermal chirp to the transmitter.

Figure 4:
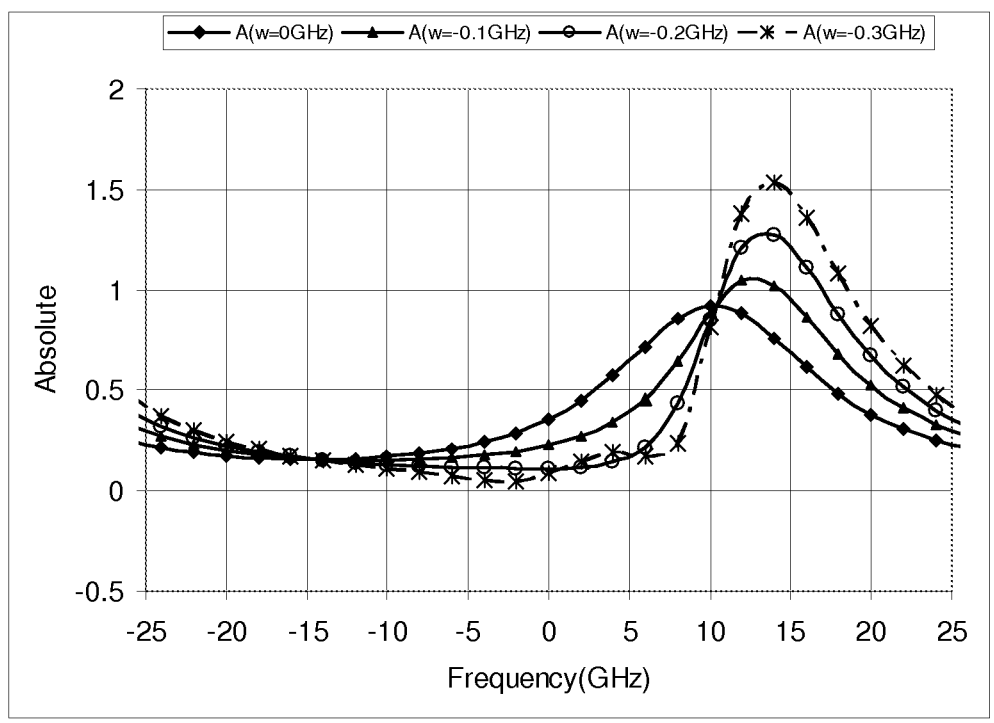
FIG. 4 is a graph of an embodiment of a plurality of etalon transmission spectra of 10G NRZ signals under different thermal chirp conditions.

FIG. 4 shows transmission spectra of the etalon signal with chirps induced by different dither signals. A large spectral distortion is apparent at the left side of the transmission peak where the traditional locking point would be chosen by the edge-locking approach. As shown, the distortion in some cases can be substantially large where the rising edge is no longer monotonic, making the edge locking method unusable. This large spectral distortion is a result of the thermal chirp which dominates the overall chirp caused by the dither. Thermal chirp depends strongly on factors such as the transmitter packaging, its geometry, its thermal contact, and its cooling efficiency. These parameters may vary from manufacturer to manufacturer. In the case where a dedicated locker is used for each transmitter, the undesirable spectral distortion can be minimized by choosing a dither frequency that has reduced thermal chirp. However, in a centralized locking scheme, one may not have the freedom to do so because the lasers to be stabilized may be manufactured by different vendors with different technologies. As a result, a dither frequency that may be good for one laser may lead to spectral distortion in the others and vice-versa, which may not be practical.

Disclosed herein is an apparatus and method that provide wavelength locking of optical laser transmitters in a laser transmitter system, such as a WDM laser transmitter. In an embodiment, the apparatus and method facilitate the determination of a locking point of laser optical transmitters, based on the peak of the spectrum of the laser. The determination of the locking point may not be significantly affected by factors such as variations in laser spectral line shape, modulation format, thermal chirp, adiabatic chirp, data rate, device manufacturing process variations, device age, temperature, or other factors. In addition, a single pilot signal generator is employed, thereby minimizing cost and complexity. By detecting both the amplitude and phase of the pilot signal that is combined with the signal of the laser optical transmitter, rather than just the power of the pilot signal, improved locking point determination is possible. In addition, the quadrature component of a first derivative of the transmission function of the etalon filter used in the apparatus and method may provide effective wavelength locking.

The laser transmitter system may comprise a plurality of optical transmitters, such as lasers, photodiodes, other devices configured to transmit electromagnetic waves at optical wavelengths, or combinations thereof. The optical wavelengths may comprise at least a portion of the visible wavelength range, infrared wavelength range, ultraviolet (UV) wavelength range, or other optical wavelength ranges. In an embodiment, the optical transmitters may be discrete transmitter units, which may be coupled to one another. For example, the discrete optical transmitters may be mounted in an array arrangement on a chip, card, or optical platform. The optical transmitters may also be coupled to an optical coupler, such as a multiplexer, which may be configured to combine the outputs from the different optical transmitters into a single output. The outputs from the different optical transmitters may have different wavelengths and the output from the optical coupler may comprise the different wavelengths of the optical transmitters. The optical coupler may be positioned on the same or different chip, card, or optical platform. The optical coupler may be coupled to the optical transmitters via a plurality of fibers or waveguides, and may also be coupled to an output via an additional fiber or waveguide. Additionally, the laser transmitter system may comprise a signal generator and a wavelength locking apparatus, which may be coupled to the optical transmitters and the optical coupler. The signal generator may provide a pilot signal onto the output of any of the optical transmitters or the optical coupler, and the wavelength locking apparatus may lock the wavelength of an optical transmitter using the pilot tone, as described below. In an alternative embodiment, at least some of the components of the laser transmitter system may be integrated into a chip, such as a planar lightwave circuit (PLC).

Figure 5:
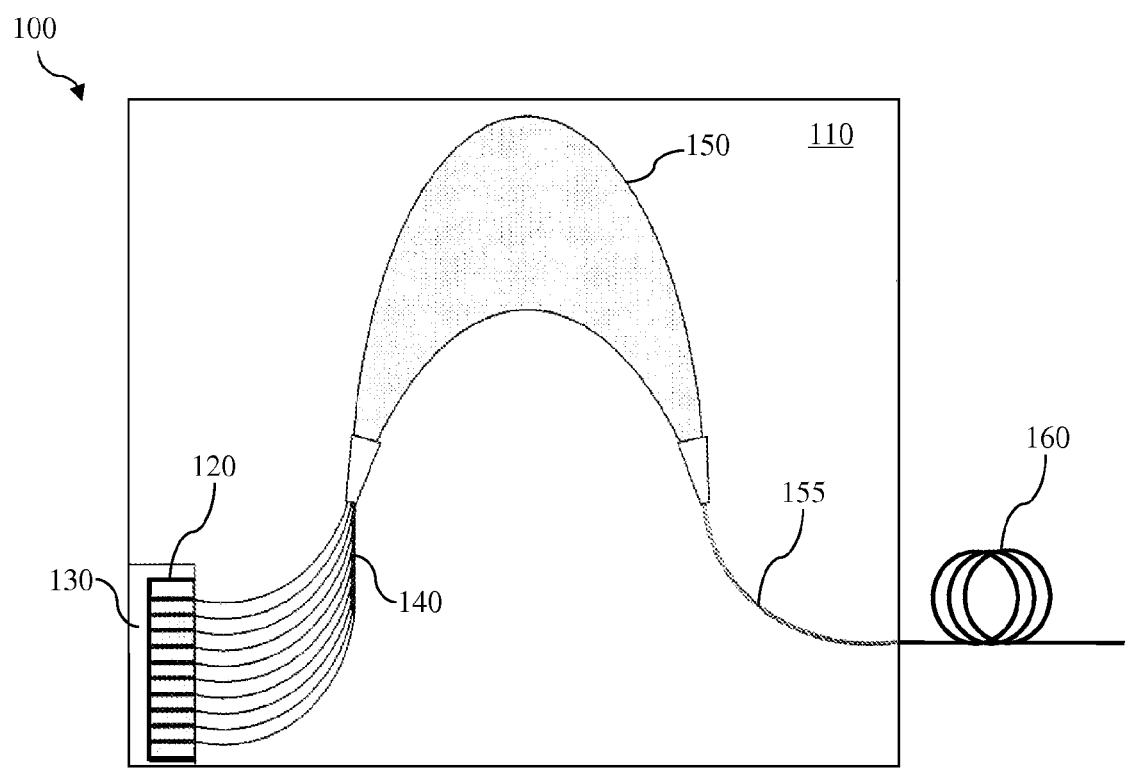
FIG. 5 is a top plan view of an embodiment of a WDM laser transmitter.

FIG. 5 illustrates an embodiment of a WDM laser transmitter 100. The WDM laser transmitter 100 may comprise a platform 110, a laser dice 120, a step 130, a plurality of first channels 140, an arrayed waveguide (AWG) 150, and optionally a second channel 155. The WDM laser transmitter 100 may also comprise or may be coupled to a fiber 160. These components may be configured according to known configurations, such as a hybrid integration configuration or a monolithic configuration. The WDM laser transmitter 100 may emit a plurality of distinct Dense WDM (DWDM) channels, as described in the International Telecommunication Union Telecommunication Standardization Sector (ITU-T) G.694.1, and/or coarse WDM (CWDM) channels, as described in the ITU-T G.694.2. As such, the WDM laser transmitter 100 may be suitable for use in backbone and/or access optical networks.

In an embodiment, the platform 110 may be configured to accommodate and integrate the components of the WDM laser transmitter 100. Specifically, the platform 110 may comprise at least one material that integrates, bonds, and/or supports the components of the WDM laser transmitter 100. The platform 110 may be produced using a deposition process, for instance on a chip or substrate. Further, the platform 110 may comprise a plurality of layers at different sites, which may be produced using deposition and/or etching. The layers may bind together other components of the WDM transmitter 100, such as the first channels 140, the AWG 150, and the second channel 155. Additionally, the layers may mount or support a component of the WDM laser transmitter 100, such as the laser dice 120. In an embodiment, the platform 110 may comprise a thin film layer of a dielectric material, such as silicon dioxide ($SiO_2$), which may be deposited on a substrate using chemical deposition, such as chemical solution deposition (CSD), chemical vapor deposition (CVD), and plasma-enhanced CVD (PECVD). Alternatively, the film layer may be deposited using physical deposition, such as thermal evaporation, sputtering, pulsed laser deposition, or cathodic arc deposition (arc-PVD). Other deposition processes also may be used, including reactive sputtering, molecular beam epitaxy (MBE), metalorganic vapor phase epitaxy (MOVPE), topotaxy, or any other suitable process. The thin film layer also may be etched at some regions of the platform 110 using wet chemical etching or dry plasma etching. The thin film layer may have a thickness less than about one mm, such as about ten micrometers.

The laser dice 120 may be the light emitting components of the WDM laser transmitter 100. The laser dice 120 may be coupled to the platform 110 and comprise a plurality of integrated semiconductor lasers, which may be configured in an array. For instance, an array of semiconductor lasers may be produced by depositing a lasing material, such as indium phosphide (InP) or gallium arsenide (GaAs), at a plurality of aligned sites on a chip. Alternatively, the lasing material may be added to the chip using chemical or electrochemical doping. The laser dice 120 may be laser diodes, heterostructure lasers, quantum well lasers, quantum cascade lasers, distributed feedback (DFB) lasers, combinations thereof, or other. The laser dice 120 may be configured to transmit a plurality of light waves substantially in the same direction, e.g., from the same side of the array. The laser dice 120 also may be configured to transmit the light waves at a plurality of wavelengths that span a bandwidth. In an embodiment, the wavelengths may be spaced by about the same value, where the difference between the values of any two wavelengths may be about the same. In an embodiment, the laser dice 120 may be coupled to the platform 110 via bonding.

In an embodiment, the laser dice 120 may be accommodated by the step 130 and the platform 110. For instance, the step 130 may be positioned at one edge of the platform 110 and coupled to the laser dice 120. The step 130 may comprise a layer of the platform 110, which may be produced via etching or deposition, and as such may comprise the same material as the platform 110, e.g. $SiO_2$. The step 130 also may be coupled to external electrical components, which may be used to operate and/or modulate the WDM laser transmitter 100, as described below.

The light emitted from the laser dice 120 may be transported to other components of the WDM laser transmitter 100 via the first channels 140. As such, the first channels 140 may be coupled to the laser dice 120 and the AWG 150 and may be aligned with the laser dice 120. The first channels 140 may comprise a plurality of waveguides, which may be configured to transfer the light from the laser dice 120 to the AWG 150. The waveguides may be dielectric waveguides, which may comprise a dielectric material that has a higher permittivity or dielectric constant than the surrounding platform 110. For example, the first channels 140 may be produced by depositing a layer of higher index material on the platform 110, etching the surrounding areas, and then depositing the same material as the platform 110 until the deposited material forms the upper cladding. Such a process may produce the same cladding material all around the channels 140. Thus, the light waves may be guided through the first channels 140 by total internal reflection from the laser dice 120 to the AWG 150.

The light waves transported by the first channels 140 may be combined into a single light wave at the AWG 150, and hence transmitted from the WDM laser transmitter 100. Accordingly, the AWG 150 may be coupled to the first channels 140 and the second channel 155. The AWG 150 may be an optical multiplex (MUX) configured to combine a plurality of light waves from the first channels 140 into a combined light wave that propagates in the second channel 155. For instance, the AWG 150 may comprise a plurality of grating waveguides, which may have different lengths, where each two adjacent grating waveguides may have about the same length difference. The light waves may correspond to the individual semiconductor lasers in the laser dice 120, where each light wave may have a different wavelength. The light waves may propagate through the grating waveguides, undergo a change of phase due to the length difference between the adjacent grating waveguides, and constructively interfere into the combined light wave at an output of the AWG 150. Hence, the combined light wave may comprise all the wavelengths of the individual light waves. The grating waveguides may be dielectric gratings waveguides, which may comprise the same material as the first channels 140, and may be produced using a process similar to the process used to produce the first channels 140.

The combined light may be transmitted from the WDM laser transmitter 100 using the second channel 155 and the fiber 160. The second channel 155 may comprise a dielectric waveguide, similar to the first channels 140. The second channel 155 may be coupled to the AWG 150 and the fiber 160, and as such may guide the combined light from the AWG 150 to the fiber 160. The second channel 155 may be produced using a process similar to the process used to produce the first channels 140. In an embodiment, the first channels 140, the AWG 150, and the second channel 155 may be positioned in the same layer of the platform 110 and may be aligned with the laser dice 120.

In an embodiment, the fiber 160 may be an optical fiber, which may be used to transport the combined light wave from the WDM laser transmitter 100 to an optical system, such as an optical telecommunications system or an optical network. Specifically, the fiber 160 may be used to transport WDM signals, such as the DWDM and/or CWDM signals described above. The fiber 160 may be a standard single mode fibers (SMFs) as defined in ITU-T standard G.652, dispersion shifted SMF as defined in ITU-T standard G.653, cut-off shifted SMF as defined in ITU-T standard G.654, non-zero dispersion shifted SMF as defined in ITU-T standard G.655, wideband non-zero dispersion shifted SMF as defined in ITU-T standard G.656, multimodal fiber, or any other type of fiber. All of the standards described herein are incorporated herein by reference.

Figure 6:
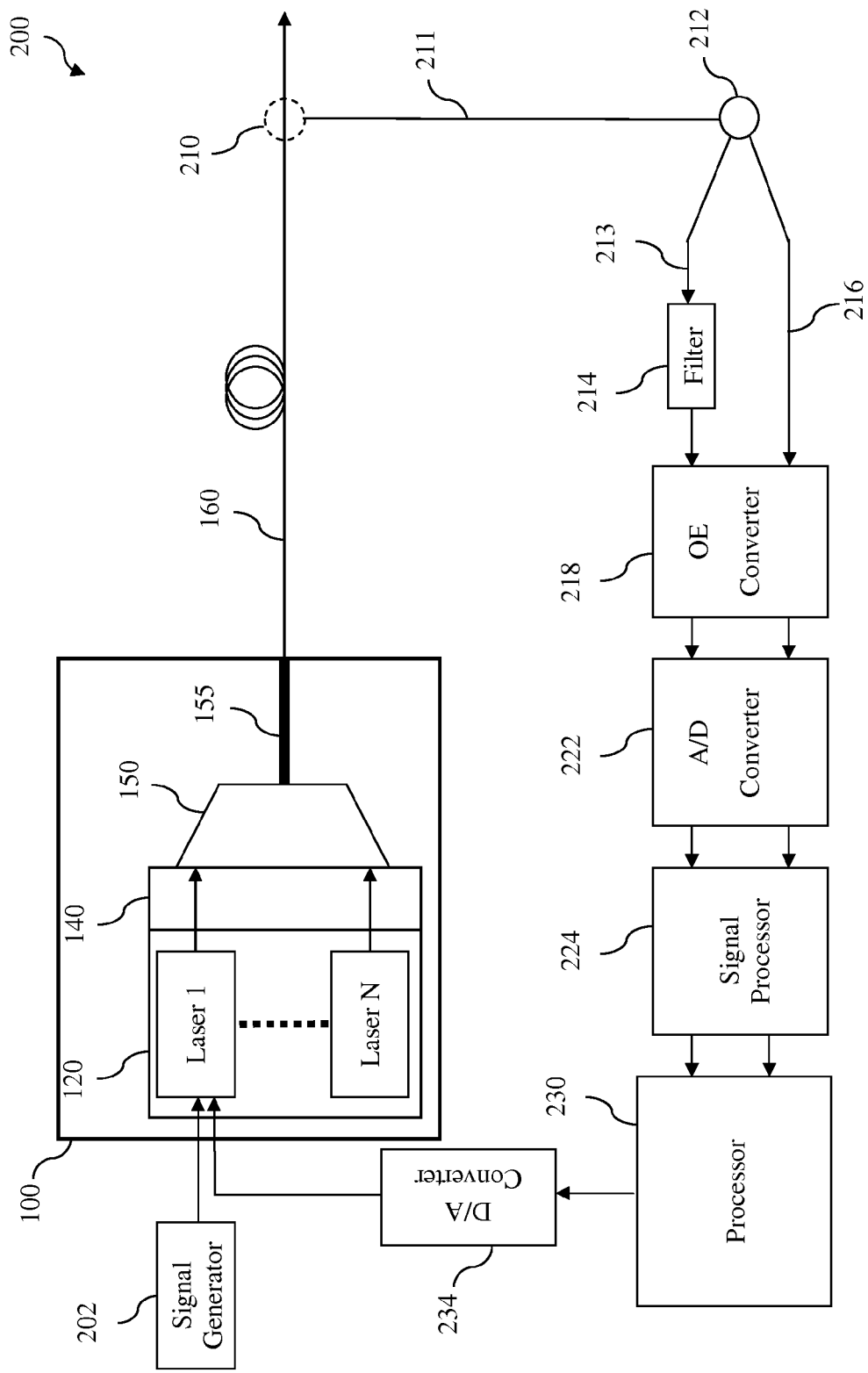
FIG. 6 is a schematic diagram of an embodiment of a WDM laser wavelength locking apparatus.

FIG. 6 illustrates an embodiment of a wavelength locking system 200. The wavelength locking system 200 comprises the WDM laser transmitter 100, a signal generator 202, the fiber 160, a coupler 210, a second fiber 211, a splitter 212, a third fiber 213, a fourth fiber 216, a filter 214, an optical-electrical (OE) converter 218, an analog-to-digital (A/D) converter 222, a signal processor 224, a processor 230, and a digital-to-analog (D/A) converter 234, configured as shown in FIG. 6. The WDM laser transmitter 100 may comprise the laser dice 120, the first channels 140, the AWG 150, the second channel 155, which may be substantially the same as described above. The remaining components of the WDM laser transmitter 100 are further described below.

In an embodiment, the signal generator 202 may be an electrical waveform generator and may be arranged so as to superpose a pilot signal onto the output of an individual laser of the laser dice. The signal generator 202 may generate a single pilot signal for all or a subset of all of the lasers in the laser dice 120. The superposition of the pilot signal onto the output of the laser of the laser dice 120 may facilitate subsequent distinction of the output of that laser from among a plurality of laser waveforms. In other embodiments, the pilot signal may be referred to as either a pilot tone or as dither. In an embodiment, the pilot signal may be a low-frequency alternating current (AC) sine wave. The frequency of the pilot waveform may be lower than the frequencies of the output of the laser transmitter, such as about one thousandth of the frequency of the output of the laser transmitter, about one millionth of the frequency of the output of the laser transmitter, or any other fraction of the frequency of the output of the laser transmitter. In an embodiment, the relationship of the amplitude of the pilot signal to the average power of the laser transmitter combined output may be referred to as modulation depth (MD). The MD may be selected such that it is less than the output of the laser transmitter, such as about one hundredth of the average power of the laser transmitter output, about one thousandth of the average power of the laser transmitter output, or any other fraction of the power of the laser transmitter output. The values of both the MD and frequency of the pilot signal may be selected such that they minimize interference with the output of the WDM laser transmitter 100.

In an embodiment, the output of the WDM laser transmitter 100 may be directed into the fiber 160. The coupler 210 may be arranged to draw a portion of the signal from the fiber 160 and direct it into the second fiber 211. In an embodiment, the coupler 210 may be an active coupler or a passive coupler, and may be one of an optical splitter, a y-coupler, a star coupler, a tree coupler, or any other suitable coupler. The splitter 212 may be arranged to divide the signal from the fiber 211 into two signals: a first signal directed into the third fiber 213 and a second signal directed into the fourth fiber 216. In an embodiment, the splitter 212 may be of the dual prism type, the half-silvered mirror type, the dichroic mirror type, the spliced optical fiber type, or other suitable splitter.

The third fiber 213 may carry the first signal to the filter 214. The filter 214 may modify, alter, or delay the first signal relative to the second signal. In an embodiment, the filter 214 may be one of a Fabry-Perot interferometer, a Gires-Tournois interferometer, or other suitable filter, and may be air-spaced, ring-spaced, solid, or of other configuration. In some instances, the filter 214 may be referred to as an etalon. In an embodiment, the filter 214 may be a 50 GHz etalon, a 100 GHz etalon, or an etalon of other suitable frequency range or spacing.

The OE converter 218 may receive the second signal, also referred to as a reference signal, from the fourth fiber 216 and the first signal from the filter 214. The OE converter 218 may use an optical-to-electrical conversion process to convert the first and second signals from optical signals to electrical signals. In an embodiment, the OE converter 218 may be a photodiode (PD), light-dependent resistor (LDR), a reverse-biased light-emitting diode (LED), a photovoltaic cell, or other suitable optical-to-electrical converter.

The A/D converter 222 may receive the first signal and the reference signal from the OE converter 218. The A/D converter 222 may convert the first signal and the reference signal from analog signals to digital signals. A/D converters 222 are well known in the art, and any suitable A/D converter may be used herein.

The signal processor 224 may receive the first signal and the reference signal from the A/D converter 222. Each of these two signals may then be processed by the signal processor 224, which converts them from the time domain to the frequency domain. For example, the signal processor 224 may implement a Fourier transform, a Fast Fourier transform (FFT), or any other suitable form of time domain to frequency domain processing.

The processor 230 may then process the signal data to facilitate wavelength locking of an individual laser of the laser dice 120. In an embodiment, the signal data may be represented mathematically by the following expressions:

$$F_s(\omega_p) = \sum_t V_s(t) \cdot e^{-i\omega_p t}$$

$$F_r(\omega_p) = \sum_t V_r(t) \cdot e^{-i\omega_p t}$$

where $F_s$ is a function of the first signal and $F_r$ is a function of the reference signal. $F_s$ and $F_r$ may represent the frequency domain waveforms that are detected by the OE converter 218, where $\omega_p$ is the frequency of the pilot signal, $\omega_c$ is frequency of the laser to be wavelength locked, $V_s(t)$ is the time-domain waveform of the first signal, and $V_r(t)$ is the time-domain waveform of the reference signal.

Additional terms may be employed to represent aspects of the wavelength locking system 200. For example, P may be used to represent the power of the optical output signal of the laser to be locked, $\Delta P$ may represent the MD of the pilot signal, and $I_{et}$ may represent the transmission function of the filter 214. Also, $\Delta \omega_a$ may represent adiabatic chirp, and $\Delta \omega_{th}$ may represent thermal chirp, both of which may be introduced by the pilot signal. The term $\phi_{th}$ may be used to represent the phase delay of the thermal chirp relative to the adiabatic chirp, and $I'_{et}$ may represent the first derivative of $I_{et}$ with respect to frequency. Given these definitions, a ratio $\alpha$ of the first signal and the reference signal, e.g.

$$\alpha = \frac{F_s(\omega_p)}{F_r(\omega_p)},$$

may be derived. In an embodiment, the following expressions may represent the real and imaginary components of $\alpha$:

$$I = \text{Re}\left[\frac{F_s(\omega_p)}{F_r(\omega_p)}\right]$$

$$= I_{et}(\omega_c) + \frac{P}{\Delta P} \cdot I'_{et}(\omega_c) \cdot (\Delta \omega_a + \Delta \omega_{th} \cdot \cos(\phi_{th}))$$

$$Q = \text{Im}\left[\frac{F_s(\omega_p)}{F_r(\omega_p)}\right] = \frac{P}{\Delta P} \cdot I'_{et}(\omega_c) \cdot \Delta \omega_{th} \cdot \sin(\phi_{th})$$

where I represents the in-phase component of cc, and Q represents the quadrature component of $\alpha$. The two expressions for I and Q may be approximations obtained by neglecting the second and higher order derivatives of the transmission function of the filter 214. In addition, the quadrature component Q of $\alpha$ may be proportional to the first derivative of the transmission function $I'_{et}$ of the filter 214. Also, the chirp induced by the pilot signal may not affect the shape of the quadrature frequency response. Further, the thermal chirp and the related phase delay may only contribute to the magnitude of the quadrature frequency response. The quadrature component may be amplified by the inverse of the modulation depth, and may thereby provide enhanced signal detection. The signal characteristics may indicate that the quadrature component may facilitate effective wavelength locking of optical laser transmitters.

The characteristics of the quadrature component, as described herein, may provide a locking point that does not experience significant deviation from the peak of the optical laser transmitter spectral line as a result of variations in transmitter properties. Variations between individual transmitters may only affect the error signal strength, not the locking point. In addition, the affect of this variation on the error signal strength may be minimized by appropriate choice of pilot signal frequency and MD. In an embodiment, an appropriate pilot signal frequency may be greater than or equal to about ten kHz and less than or equal to about 500 kHz, or other suitable frequency. In another embodiment, an appropriate MD may be about two percent of the output power of the average power of the WDM output, about five percent of the output power of the average power of the WDM output or other fraction of the power of the WDM output. Hence, the processor 230 may determine whether the optical transmitters 120 are locked onto the appropriate wavelengths. If an optical transmitter 120 is not locked onto the appropriate wavelengths, the processor 230 may generate an appropriate adjustment signal.

The D/A converter 234 may receive the adjustment signal from the processor 230. The D/A converter 234 may convert the adjustment signal from a digital signal to an analog signal. D/A converters 234 are well known in the art, and any suitable D/A converter may be used herein.

In an embodiment, the OE converter 218, the A/D converter 222, and the signal processor 224 may be arranged to have individual ports or channels to manage the two separate signals. In another embodiment, the two separate signals may be managed by arranging individual component OE converters 218, A/D converters 222, and/or signal processors 224 appropriately for each of the signals. Alternatively or additionally, the OE converter 218, the A/D converter 222, the signal processor 224, the processor 230, and/or the D/A converter 234 may be discrete components as shown or may be combined together into a single component.

In an embodiment, the quadrature component of cc may be employed as a component of time-domain multiplexing (TDM) to perform wavelength locking of multiple individual lasers of the WDM laser transmitter 100. In an embodiment, TDM may be employed when the signal generator 202 applies a pilot signal to a first laser optical transmitter n at timeslot $t_n$. The wavelength locker may detect the wavelength $\lambda_n$ of the laser optical transmitter n, based on recognition of the pilot signal applied to the laser optical transmitter n and instruct the laser optical transmitter n to tune its wavelength $\lambda_n$ to a target wavelength. This may be repeated for the next timeslot $t_{n+1}$ for transmitter n+1, and so on until all laser optical transmitters have been wavelength locked accordingly.

Figure 7:
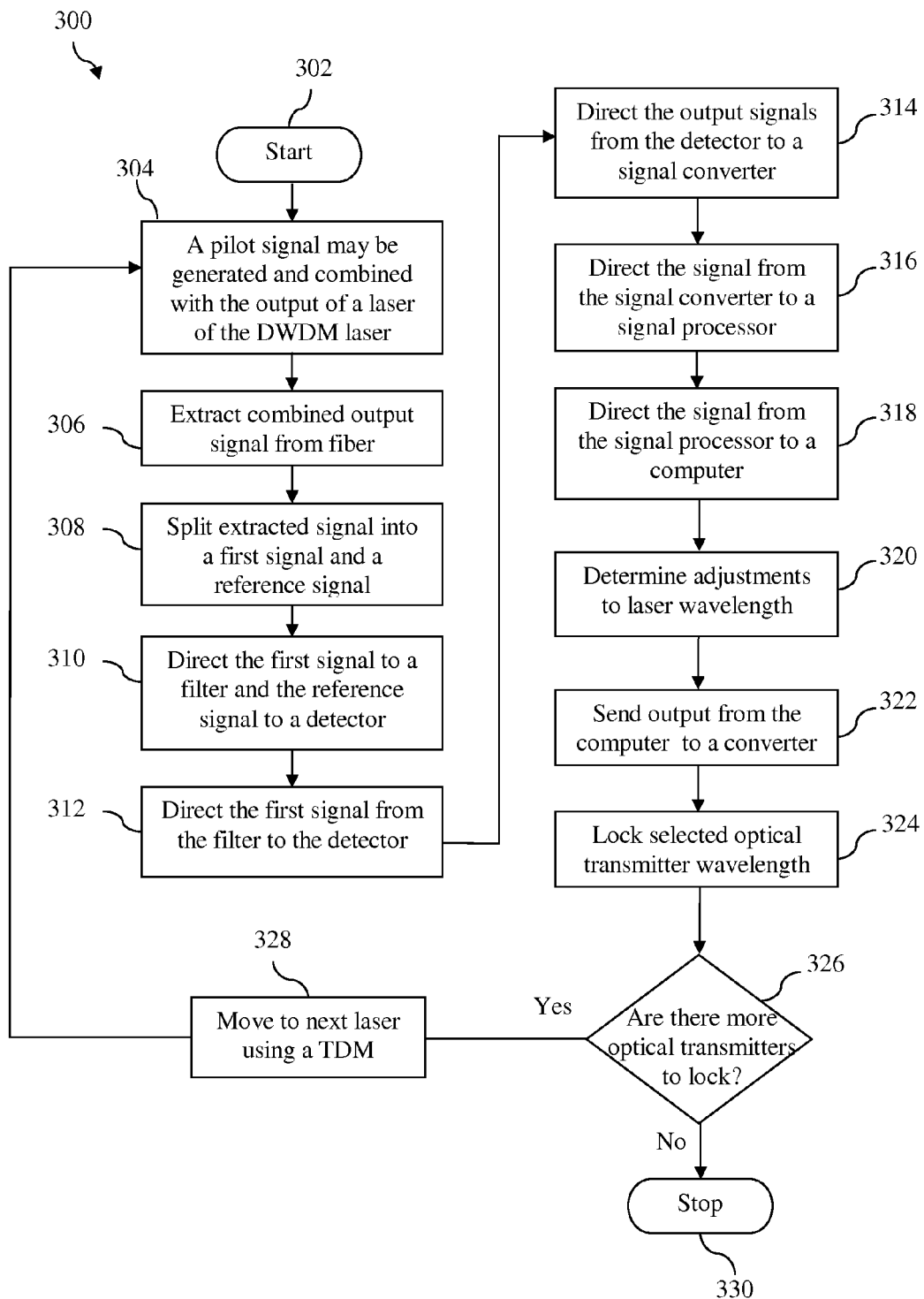
FIG. 7 is a flowchart of an embodiment of a WDM laser wavelength locking method.

FIG. 7 illustrates one embodiment of a TDM wavelength locking method 300. At block 302, the method 300 starts. At block 304, a pilot signal may be generated, e.g. using the signal generator, and combined with the output signal of a laser of the WDM laser transmitter that is to be wavelength locked. At block 306, the combined output signal of WDM laser transmitter and the pilot signal may be extracted from the fiber by, for example, a coupler. In embodiments, the extraction may be from the second channel or from the fiber. At block 308, the extracted signal may be split into a first signal and a reference signal, e.g. by a splitter.

At block 310, the first signal may be directed, for example, through a third fiber to a filter, such as an etalon. At block 312, the first signal may then be directed to a detector, such as an OE converter. At block 314, the first signal and the reference signal may be processed by, for example, an A/D converter. In an embodiment, the A/D converter may contain a memory (not shown) to temporarily collect and store a quantity of the signal. In an embodiment, the quantity of the stored signal may be an amount of time sufficient to provide resolution of the frequency of the pilot signal, for example about one tenth of the period of the pilot signal, about two tenths of the period of the pilot signal, about seven tenths of the period of the pilot signal, or other suitable fraction of the frequency of the pilot signal.

At block 316, the signal A/D converter output of the first signal and the signal A/D converter output of the reference signal may undergo additional processing, such as by a signal processor. In an embodiment, the signal processor may process the first signal and the reference signal, where processing may include FFT processing of the signals. The wavelength locking system may thereby obtain the quadrature component of $\alpha$. The magnitude and sign of the quadrature component of a may provide information of the deviation of the output wavelength of the WDM laser transmitter from the target wavelength. For example, if the sign of $\alpha$ is positive and the magnitude of $\alpha$ corresponds to an offset of 3 GHz, the WDM laser transmitter may be instructed to tune its wavelength in the negative direction 3 GHz.

At block 318, the output of the signal processor may be directed to a processor. In an embodiment, the processor may comprise a microprocessor, a computer, or any other computing device. At block 320, a determination is made regarding the magnitude and direction of adjustment of the laser wavelength. At block 322, information may be sent to the WDM laser transmitter instructing the WDM laser transmitter to tune its wavelength to the appropriate wavelength. In an embodiment, the tuning may employ adjusting the temperature of the laser or other means of adjustment to tune the wavelength of the WDM laser transmitter to the target wavelength. At block 324, the wavelength of the WDM laser transmitter may be considered locked at the target wavelength. At block 326, if there are more lasers to be locked, the wavelength locking system may move to the next laser on the laser dice, using the TDM scheme as described herein. At block 328, method 300 may repeat for each of N lasers in the laser dice. If at block 326, there are no more lasers to be locked, the method 300 may stop at block 330.

Figure 8:
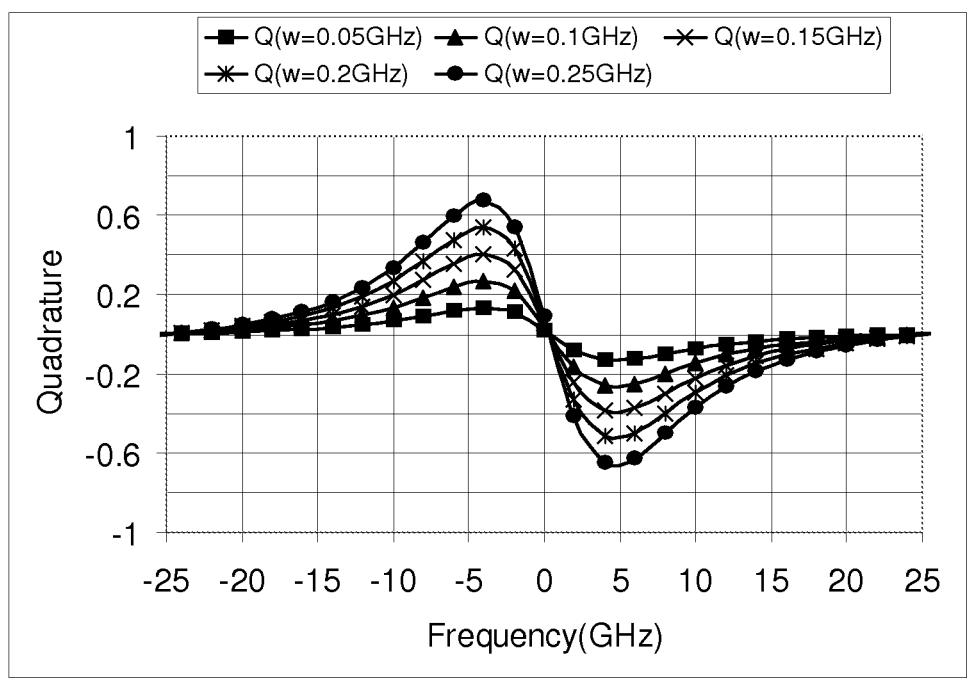
FIG. 8 is a graph of an embodiment of a plurality of frequency responses of a quadrature component under different chirp conditions.

FIG. 8 shows the frequency response of the quadrature component under different chirp conditions. The spectra of quadrature components were calculated at 0.05 GHz, 0.1 GHz, 0.15 GHz, 0.2 GHz, and 0.25 GHz. The location of the transmission peak of the etalon corresponds to the crossing point at zero amplitude. A deviation from zero represents an offset from the target wavelength and can be corrected using a conventional control and/or feedback loop.

Figure 9:
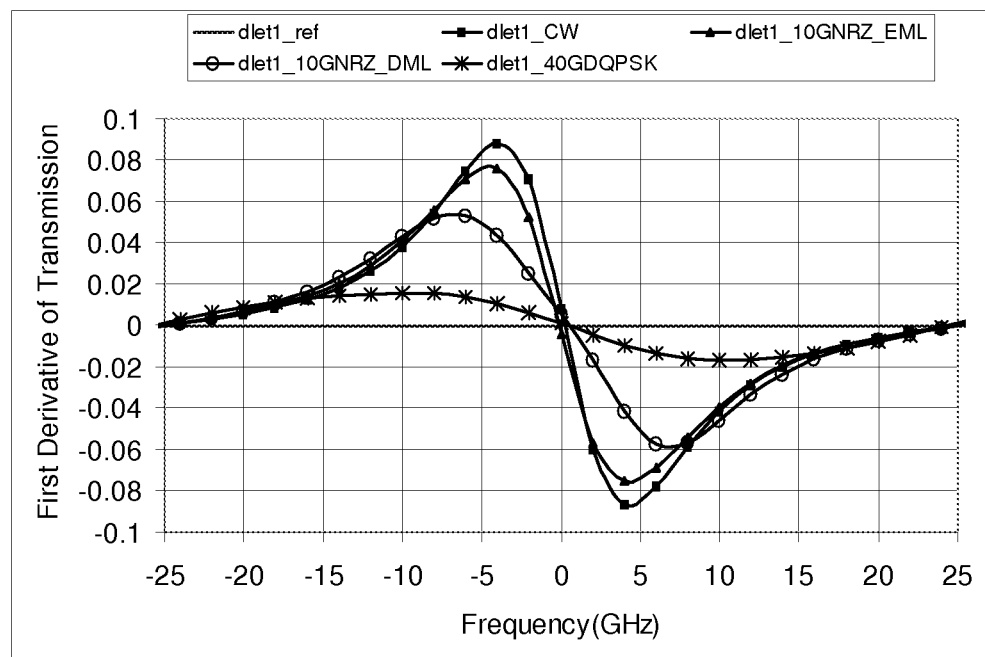
FIG. 9 is another graph of an embodiment of a plurality of frequency responses of a quadrature component with different modulated signals.

FIG. 9 further shows quadrature spectra of the same set of lasers represented in FIG. 2, with the addition of a reference signal represented by the straight horizontal line. The data shown in FIG. 9 was calculated using measured spectra of transmitters and 50 GHz etalon according to the system and method of the disclosure. The demonstrated deviation from zero at the crossing point of the reference line is about +1 GHz, indicating a sufficient level of accuracy to wavelength lock a WDM laser transmitter effectively.

In an embodiment, the system and method taught herein may be implemented with off-the-shelf components that may be commercially available. In an embodiment, the wavelength locking system 200 of the present disclosure may be implemented as a frequency locking system, and some embodiments may therefore be described and/or implemented in a frequency domain scenario.

Figure 10:
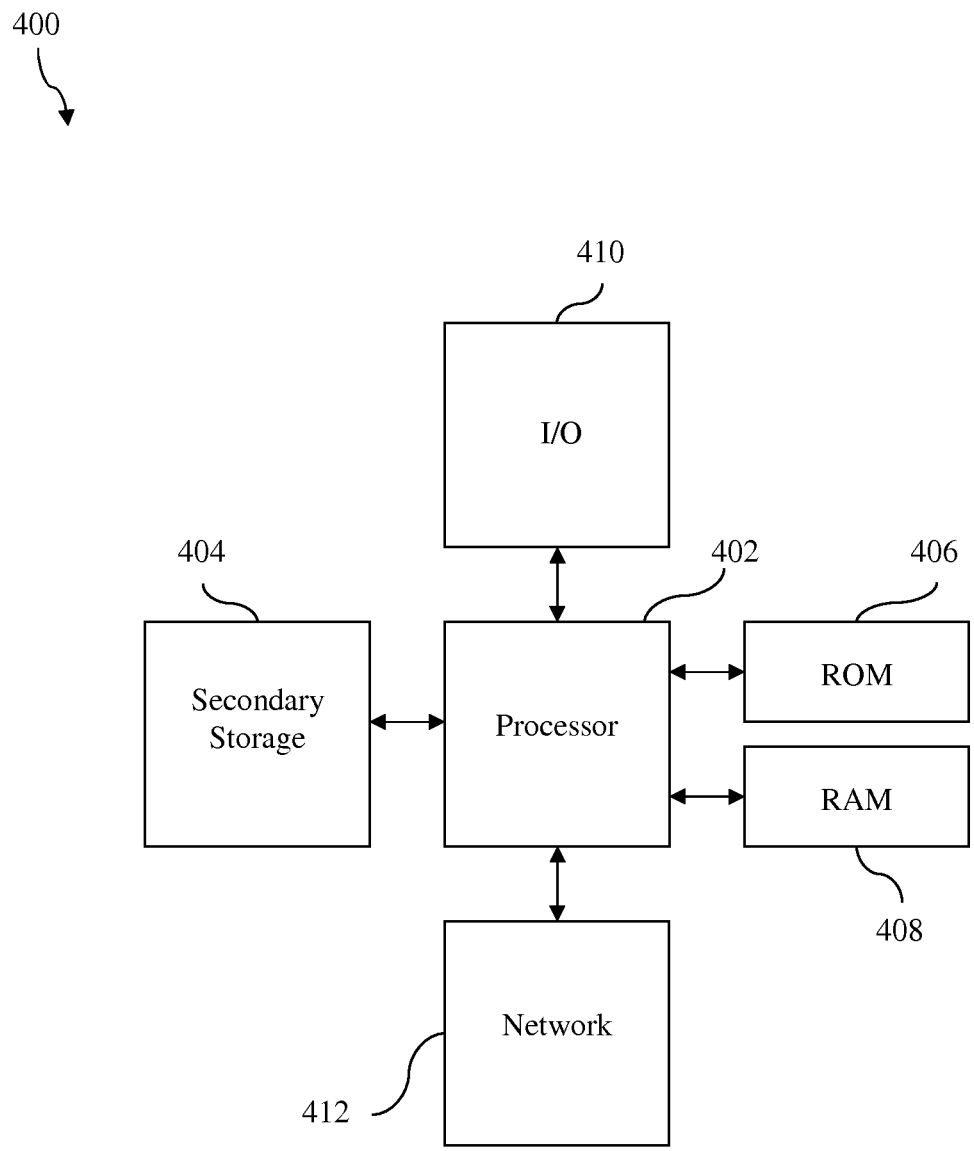
FIG. 10 is a schematic diagram of an embodiment of a general-purpose computer system.

FIG. 10 illustrates a typical, general-purpose computer, suitable for implementing one or more embodiments of any component disclosed herein. The computer 400 includes a processor 402 (which may be referred to as a central processor unit or CPU) that is in communication with memory devices including secondary storage 404, read only memory (ROM) 406, random access memory (RAM) 408, input/output (I/O) devices 410, and network connectivity devices 412. The processor may be implemented as one or more CPU chips, or may be part of one or more application specific integrated circuits (ASICs).

The secondary storage 404 is typically comprised of one or more disk drives or tape drives and is used for non-volatile storage of data and as an over-flow data storage device if RAM 408 is not large enough to hold all working data. Secondary storage 404 may be used to store programs that are loaded into RAM 408 when such programs are selected for execution. The ROM 406 is used to store instructions and perhaps data that are read during program execution. ROM 406 is a non-volatile memory device that typically has a small memory capacity relative to the larger memory capacity of secondary storage 404. The RAM 408 is used to store volatile data and perhaps to store instructions. Access to both ROM 406 and RAM 408 is typically faster than access to secondary storage 404.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_1+k*(R_u-R_1)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
 a plurality of optical transmitters coupled to a fiber;
 a signal generator coupled to the optical transmitters and configured to provide a single pilot tone to the optical transmitters;
 an optical splitter coupled to the fiber, positioned within a feedback loop between the fiber and the optical transmitters, and having a first output and a second output;
 an etalon filter positioned within the feedback loop and coupled to the first output;
 an optical-to-electrical (O/E) converter coupled to the etalon filter and the first output, wherein the O/E converter is configured to convert an output of the etalon filter and the second output to electrical signals; and
 a processor coupled to the O/E converter, wherein the processor is configured to:
  compute a quadrature component as an imaginary component of a frequency-domain output of the etalon filter divided by the second output in the frequency domain; and
  adjust a wavelength for each of the optical transmitters to lock the wavelengths based on a magnitude and a sign of the quadrature component.

2. The apparatus of claim 1, wherein the optical transmitters produce different spectral shapes.

3. The apparatus of claim 1, wherein the optical transmitters produce substantially the same spectral shapes.

4. The apparatus of claim 1, wherein the pilot tone is provided to the optical transmitters using time-division multiplexing.

5. The apparatus of claim 1 further comprising an analog-to-digital (A/D) converter positioned within the feedback loop between the O/E converter and the processor.

6. The apparatus of claim 5 further comprising a Fast Fourier Transform (FFT) processor positioned within the feedback loop between the A/D converter and the processor.

7. The apparatus of claim 6 further comprising a digital-to-analog (D/A) converter positioned within the feedback loop between the processor and the optical transmitters.

8. The apparatus of claim 7, wherein the FFT processor is configured to:
 compute the frequency-domain output of the etalon filter as a first Fourier transform of the output of the etalon filter; and
 compute the second output in the frequency domain as a second Fourier transform of the second output.

9. The apparatus of claim 8, wherein any deviation of the quadrature component from zero represents an offset from a target wavelength.

10. The apparatus of claim 9, wherein the first Fourier transform and the second Fourier transform are each fast Fourier transforms (FFTs).

11. An apparatus comprising:
 an optical-electrical converter configured to:
  receive a reference optical signal and a transmitted optical signal, wherein the reference optical signal is a filtered apportionment of the transmitted optical signal comprising a pilot tone; and
  convert the reference optical signal and the transmitted optical signal to electrical signals; and
 at least one processor configured to:
  calculate a quadrature component based on a first Fourier transform of the transmitted optical signal and a second Fourier transform of the reference optical signal, wherein the quadrature component is the imaginary component of the first Fourier transform of the transmitted optical signal divided by the second Fourier transform of the reference optical signal;
  detect a magnitude and a sign of the quadrature component; and
  wavelength lock the optical signal using the amplitude and the sign of the quadrature term.

12. The apparatus of claim 11, wherein calculating the quadrature component comprises passing the optical signal through an etalon filter.

13. The apparatus of claim 11, wherein wavelength locking the optical signal comprises changing at least one parameter of an optical transmitter that produces the optical signal.

14. The apparatus of claim 13, wherein the pilot tone is provided to the optical transmitters using time-division multiplexing.

15. The apparatus of claim 13, wherein the pilot tone is provided to the optical transmitter using frequency-division multiplexing.

16. The apparatus of claim 11, wherein the frequency of the pilot tone is from about 1 kilohertz (kHz) to about 500 kHz.

17. The apparatus of claim 11, wherein any deviation of the quadrature component from zero represents an offset from a target wavelength.

18. The apparatus of claim 17, wherein the first Fourier transform and the second Fourier transform are each fast Fourier transforms (FFTs).

19. A method comprising:
splitting an optical signal generated by an optical transmitter into a first signal and a reference signal, wherein the optical signal comprises a pilot signal and a data signal;
filtering the first signal to obtain a filtered first signal;
converting the filtered first signal and the reference signal to electrical signals;
computing a first Fourier transform of the filtered first signal;
computing a second Fourier transform of the reference signal;
determining a quadrature component based on the first Fourier transform of the filtered first signal and the second Fourier transform of the reference signal, wherein the quadrature component is an imaginary component of the first Fourier transform of the filtered first signal divided by the second Fourier transform of the reference signal; and
determining whether an output from the optical transmitter needs to be adjusted based on a magnitude and a sign of the quadrature component.

20. The method of claim 19, wherein the quadrature component is modeled as $$\frac{P}{\Delta P} \cdot I'_{et}(\omega_c) \cdot \Delta\omega_{th} \cdot \sin(\phi_{th}),$$

where P is a power of the optical signal, $\Delta P$ is a modulation depth of the pilot signal, $I'_{et}$ is a first derivative of a transmission function from a filter with respect to frequency, $\omega_c$ is a frequency of the optical signal, $\Delta\omega_{th}$ is a thermal chirp introduced by the pilot signal, and $\phi_{th}$ is a phase delay of the thermal chirp relative to an adiabatic chirp introduced by the pilot signal.

21. The method of claim 19, wherein any deviation of the quadrature component from zero represents an offset from a target wavelength.

22. The method of claim 21, wherein the first Fourier transform and the second Fourier transform are each fast Fourier transforms (FFTs).

* * * * *